United States Patent [19]

Cricchi

[11] 3,845,327

[45] Oct. 29, 1974

[54] COUNTER WITH MEMORY UTILIZING MNOS MEMORY ELEMENTS

[75] Inventor: James R. Cricchi, Catonsville, Md.

[73] Assignee: Westinghouse Electric Corporation, Pittsburgh, Pa.

[22] Filed: Aug. 16, 1972

[21] Appl. No.: 281,069

[52] U.S. Cl. .......... 307/238, 307/220 C, 307/224 C, 307/225 C, 307/251, 340/173 R, 340/173 FF, 357/23

[51] Int. Cl. .......... G11c 11/40

[58] Field of Search .. 317/235 AZ; 307/251, 220 C, 307/224 C, 225 C, 238; 340/173 R, 173 FF

[56] References Cited

UNITED STATES PATENTS

| | | | |
|---|---|---|---|
| 3,657,614 | 4/1972 | Cricchi | 317/235 |
| 3,660,827 | 5/1972 | Tickle | 340/173 FF |
| 3,676,717 | 7/1972 | Lockwood | 307/304 |
| 3,719,866 | 3/1973 | Naber et al. | 317/235 |

*Primary Examiner*—Rudolph V. Rolinec
*Assistant Examiner*—Joseph E. Clawson, Jr.
*Attorney, Agent, or Firm*—J. B. Hinson

[57] ABSTRACT

An improved integrated counter stage employing non-volatile MNOS memory elements in series with static load transistors to facilitate a non-complementing counter. Incorporated into the counter are means for reducing memory pulse feedthrough and for providing transient clipping, resulting in increased reliability.

6 Claims, 7 Drawing Figures

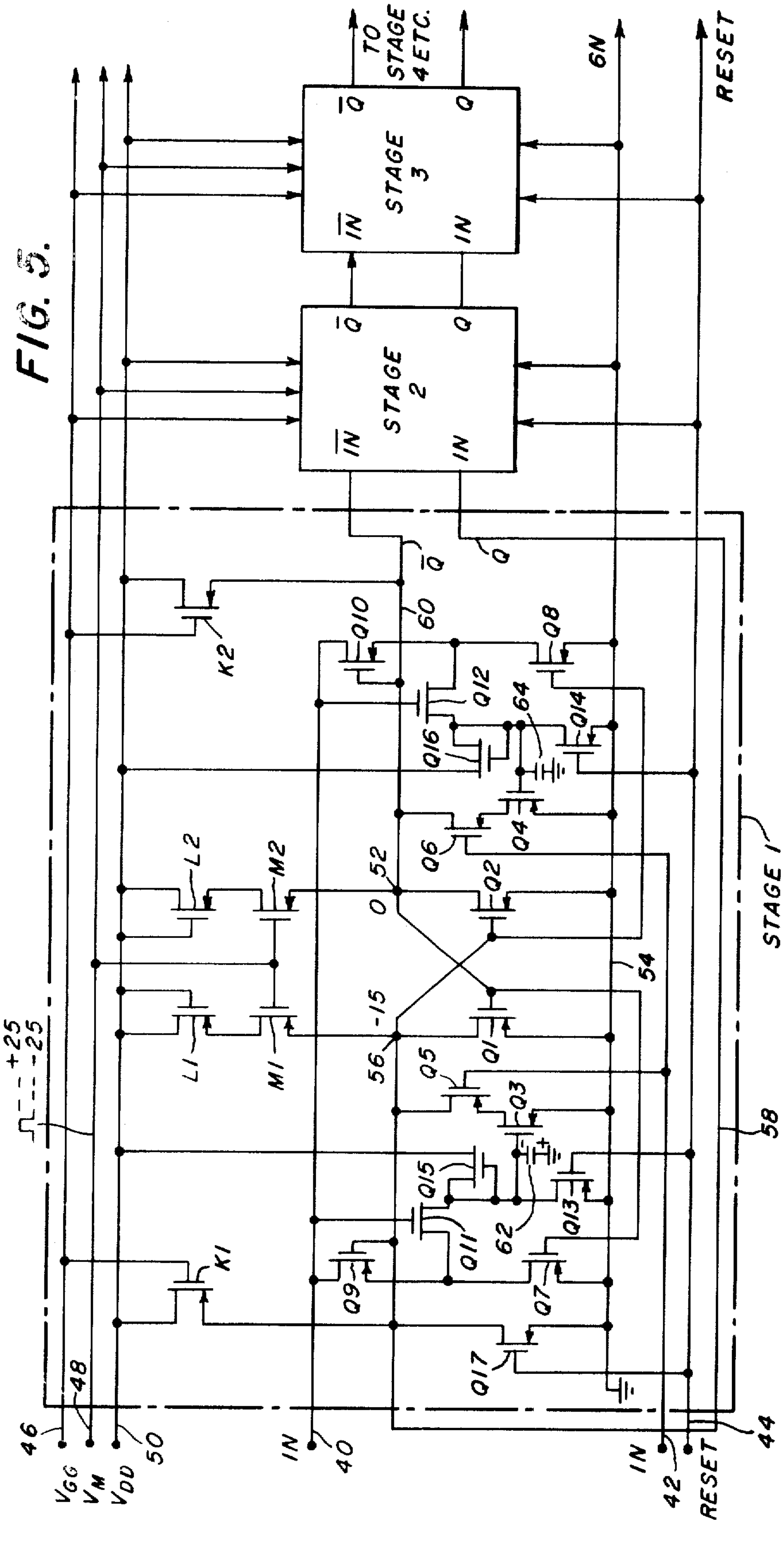
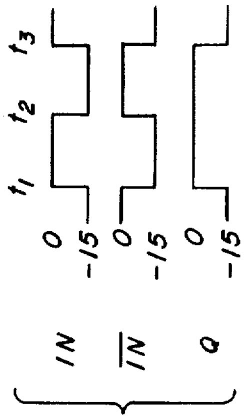
FIG. 6.

COUNTER WITH MEMORY UTILIZING MNOS MEMORY ELEMENTS

BACKGROUND OF THE INVENTION

There are certain applications for counters, such as binary counters, where means must be provided to preserve the count of the counter even in the event of a power failure. For example, when counters are employed in a metering system, such as an automatic electric meter reading system, some means must be provided for preventing the loss of the count stored in the counter even though power to the counter may fail.

What is needed, of course, is some type of memory element incorporated into the counter itself. One form of transistor memory element is a standard insulated-gate field effect transistor structure in which the silicon dioxide gate insulator is replaced by a double insulator, typically a layer of silicon dioxide nearest the silicon substrate and a layer of silicon nitride over the silicon dioxide. This structure is commonly called a metal-nitride-oxide semiconductor memory transistor. The hysteresis or memory of the device is associated with the existence of traps (electronic states) at or near the silicon dioxide-silicon nitride interface, the threshold voltage of the insulator-gate field effect transistor being influenced by the charged state of the traps. These traps are conventionally charged and discharged by the application of a sufficiently large voltage of suitable polarity to the gate electrode; while information is read out of the device via the source and drain electrodes of the field effect transistor.

In an MNOS memory device having an N-type substrate and P-type source and drain regions, for example, application of a relatively large positive potential between the gate and substrate will charge the traps negatively and cause a permanent P-type channel to exist between the drain and source. Reversal of the large potential will charge the traps positively forming an N-type channel to exist between the source and drain. Thereafter, current can be made to flow or cut off between the source and drain by application of a suitable, lower bias voltage.

The difficulty encountered with most MNOS memory devices of this type is that the devices switch between the enhancement mode and the depletion mode in response to large polarizing voltages which reverse the hysteresis state. In the enhancement mode, the device is normally OFF and will conduct only when a voltage of the correct polarity and magnitude is applied between the gate and source. In the depletion mode, the device is normally ON and will conduct until a voltage of the correct polarity is applied to turn it OFF. For this reason, conventional MNOS memory devices are not suitable for use in storing the count of a counter.

In copending application Ser. No. 219,463, filed Jan. 20, 1972 (Case WE-43,060) there is described an MNOS memory device wherein the thickness of the silicon dioxide layer over the source and drain regions is great enough to prevent tunneling therethrough at a predetermined polarizing voltage. However, between the source and drain regions, the thickness of the silicon dioxide layer is reduced to a value which will permit tunneling therethrough at the aforesaid predetermined polarizing voltage. This insures that the memory device will always operate in the enhancement mode. At the same time, the increased thickness of the oxide over the source and drain regions increases the gate-todrain and gate-to-source breakdown voltages, thereby reducing capacitive feedthrough and increasing the performance characteristics of the device.

SUMMARY OF THE INVENTION

In accordance with the present invention, a new and improved integrated circuit counter with memory is provided wherein MNOS memory elements are connected in series with the load elements of the counter (i.e., the two transistors forming the switching elements in each flip-flop stage of a binary counter). A minimum gate area is used in the MNOS memory elements to reduce capacitive feedthrough of a memory pulse which might otherwise result in a false change in state of the counter. In addition, "keeper" load elements are provided in the counter to prevent loss of operation when the memory load element is turned OFF during a positive memory clear pulse. The "keeper" load element also limits or clips positive-going transients to a relatively low voltage by source follower action.

The fabrication of the counter in an integrated circuit configuration requires only a single diffusion step. Silicon nitride is used for the MNOS memory elements as well as for passivation of the non-memory logic elements. A thick oxide layer, typically silicon dioxide, is used between the elements to eliminate parasitic surface coupling with graduated oxide steps to insure interconnection reliability.

The above and other objects and features of the invention will become apparent from the following detailed description taken in connection with the accompanying drawings which form a part of this specification, and in which:

FIG. 5 is a schematic circuit diagram of one stage of the counter of the invention showing the use of memory elements therein;

Figure 7:
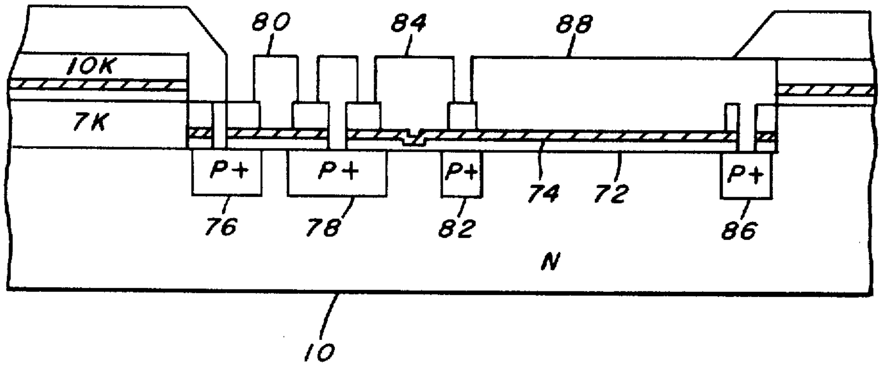

FIG. 6 comprises waveforms illustrating the operation of the counter of FIG. 5; and FIG. 7 is a cross-sectional view showing the manner of fabrication, on an integrated circuit wafer, of the memory elements of the invention in combination with the counter switching elements and load elements.

Figure 1:
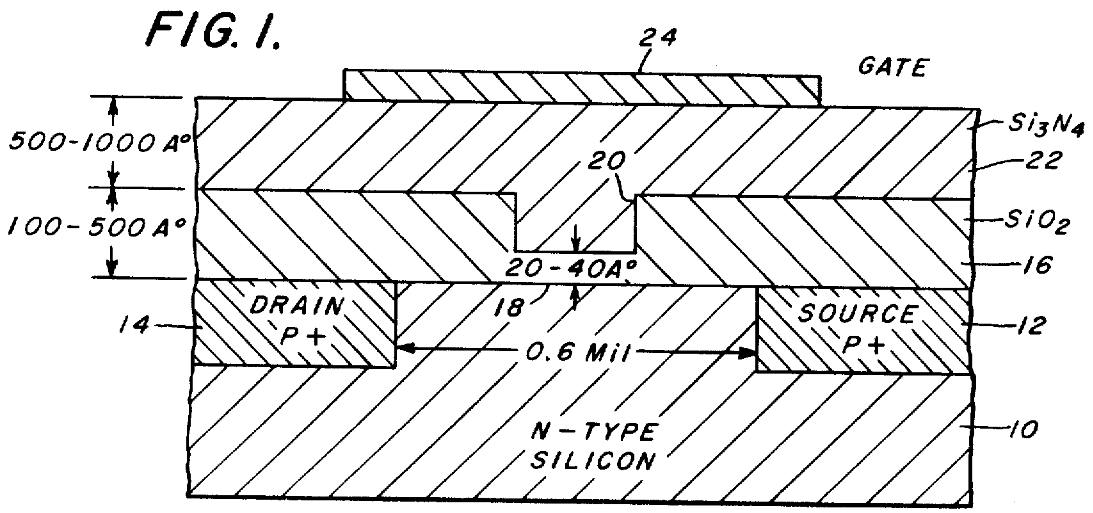
FIG. 1 is a cross-sectional view of the MNOS memory devices utilized in the counter of the invention.

With reference now to the drawings, and particularly to FIG. 1, the metal-nitride-oxide semiconductor device shown includes a substrate 10 of N-type silicon having P+ source and drain regions 12 and 14 diffused into the upper surface thereof and separated by a space typically having a width of about 0.6 mil. Deposited on the upper surface of the substrate 10 is a layer 16 of silicon dioxide having a thickness over the source and drain regions of about 100–500 Angstrom units and preferably 400 Angstrom units. However, intermediate the source and drain regions 14 and 16 is a reduced thickness region 18 of about 20–40 Angstrom units and preferably 25 Angstrom units. Covering the silicon dioxide layer 16, and including the well 20 formed by the reduced thickness region 18, is a layer of silicon nitride 22. Finally, a gate electrode 24 of aluminum or some other similar material is deposited upon the silicon nitride layer 22.

Figure 2:
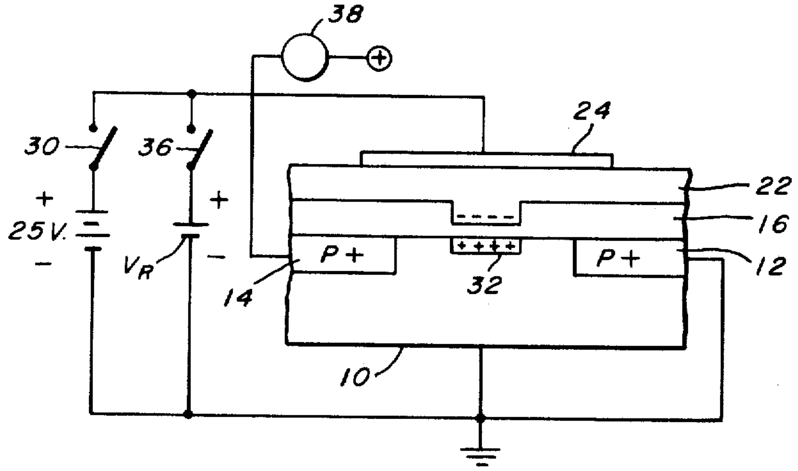
FIG. 2 illustrates the formation of an inversion layer beneath a silicon dioxide-substrate junction when the MNOS memory device of the invention is enabled by application of a polarizing voltage of one polarity.
Figure 3:
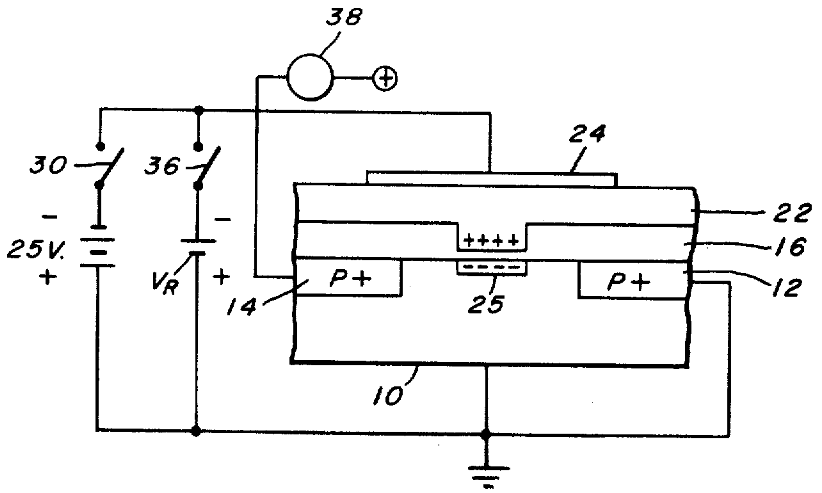
FIG. 3 is an illustration, similar to that of FIG. 2, showing the formation of a charge accumulation layer when the device is disabled by application of a voltage of the opposite polarity.

The hysteresis effect of the device shown in FIG. 1 is associated with the existence of traps (electronic states) at or near the interface between the silicon dioxide and silicon nitride layers 16 and 22. If a voltage, typically about 25 volts, is applied between the gate electrode 24 and substrate 10 with the gate negative with respect to the substrate as shown in FIG. 3, a stored charge comprising holes will form at the nitride-oxide interface. This, in turn, causes a negative charge accumulation layer 25 to exist in the substrate 10 beneath the silicon dioxide layer 16. When the bias voltage of about 25 volts is removed, the negative charge accumulation layer will persist. Similarly, if a voltage is applied between the gate 24 and substrate 10 with the gate positive with respect to the substrate as shown in FIG. 2, negative charges will accumulate at the silicon dioxide-silicon nitride interface, resulting in an inversion layer of holes 32 in the surface of the substrate 10 beneath the silicon dioxide layer, forming a partial P-channel between the source and drain. This inversion layer will persist after the bias voltage is removed.

Figure 4:
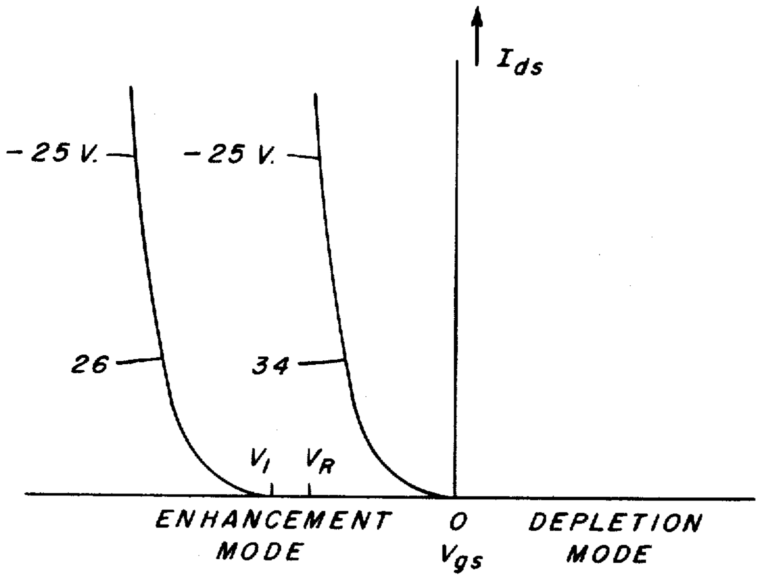
FIG. 4 is a plot of drain-source current versus gate-substrate voltage showing the manner of operation of the memory elements of the invention.

It is desirable for memory devices of this type to operate in the enhancement mode. That is, it is desirable for them to be normally OFF and to be turned ON in response to a bias voltage smaller than the original bias voltage which was applied to create the inversion layer or negative charge accumulation layer. The transfer characteristics are illustrated in FIG. 4 where drain-source current is plotted versus gatesubstrate voltage. When a negative voltage of about −25 volts is applied to the gate 24, the transfer curve may appear as at 26. Once the bias voltage of −25 volts is removed, drain-source current will occur only when the bias voltage is again increased to the value $V_L$. On the other hand, when the bias voltage switches to +25 volts, the transfer curve changes to that indicated by the reference numeral 34 in FIG. 4.

In the absence of the increased oxide thickness over the source and drain, the transfer characteristic, upon application of a bias voltage of +25 volts, will shift further to the right as viewed in FIG. 4 and into the depletion mode such that the device will be normally ON or conducting. The use of the reduced oxide thickness between the source and drain, while maintaining the oxide thickness over the source and drain thicker, results in the transfer characteristics shown in FIG. 4 as is more fully described in the aforesaid copending application Ser. No. 219,463, filed Jan. 20, 1972, (Case WE 43,060). With the transfer characteristic indicated by curve 34, no current will flow between the source and drain with no applied bias. However, when a small bias voltage $V_R$, which is less than 25 volts, is applied by closing switch 36, the device will conduct in the enhancement mode.

While the foregoing discussion assumes that a separate bias voltage, less than 25 volts, is applied between the source and gate in order to render the device conductive, it will be appreciated that the voltage across the gate insulator, which controls conduction, is equal to the gate voltage minus any voltage applied to the source 12, for example. If it is assumed that the voltage on the gate is −25 volts and that the voltage on the source is −15 volts, the voltage across the gate insulator is equal to −10 volts, which will not initiate charge transport to the traps. On the other hand, if the voltage on the source should be zero while the voltage on the gate is −25 volts, the voltage across the insulator is −25 volts and the traps will charge positively. Application of a voltage of +25 will "clear" the memory element, regardless of whether the voltage on the source is zero or a minus voltage.

With reference now to FIG. 5, three stages 1, 2 and 3 of a binary counter are shown, the details of only stage 1 being shown. The pulses to be counted are applied to terminal 40 identified as IN; while the complement of the pulses to be counted are applied to terminal 42 identified as $\overline{\text{IN}}$. Reset pulses can be applied to terminal 44. Also applied to the counter on terminal 46 is a voltage $V_{GG}$ typically having a voltage value of about −20 volts. Applied to terminal 48 is a pulsed signal which changes from −25 volts to +25 volts and immediately returns back to −25 volts following each time the counter stage changes state. Finally, to terminal 50 is applied a voltage $V_{DD}$ typically having a voltage of −25 volts.

The two switching elements of the counter of stage 1 are identified as Q1 and Q2. The gate electrodes of the two transistors Q1 and Q2 are interconnected in a conventional flip-flop configuration such that when one transistor conducts the other is cut off and vice versa. In series with the transistor Q1 is a first MNOS memory element M1, such as that shown in FIG. 1, together with a first load transistor L1. Similarly, a second memory element M2 is connected in series with the switching transistor Q2 along with load transistor L2.

In operation, assume that transistor Q1 is OFF while transistor Q2 is ON. Under these circumstances, the voltage at point 52 will be zero since it is connected to the ground lead 54 through transistor Q2. Point 56, however, will be typically at −15 volts since it is connected to $V_{DD}$=−25 through the load transistor L1 and memory transistor M2.

With reference to FIG. 6, it will be noted that the IN pulses to be counted switch from −15 volts to zero volts and then back to −15 volts. The state of the input pulses is determined by the voltage at points 52 and 56 from the previous counter stage. Point 56 is connected to lead 58 having a signal Q thereon which is the output of stage 1 of the counter. This is applied as an IN input to the second stage 2. Point 52, on the other hand, is connected to the lead 60 on which the complement $\overline{Q}$ of the output appears. This is also applied to stage 2.

Assuming, again, that a voltage of −15 volts is on point 56 which is connected to the gate electrode of transistor Q9, and that point 40 (IN) is negative, it will conduct current from lead 40 through transistor Q11 to charge capacitor 62 with the polarity shown. That is, it is charged such that the gate of transistor Q3 is negative. However, current will not flow between the source and drain of transistor Q3 at this time since the transistor Q5 is cut off, having its gate electrode connected to the $\overline{\text{IN}}$ terminal 42 which, for the conditions assumed, is at zero volts as shown in FIG. 6. Now, at time $t_1$ shown in FIG. 6, the IN signal will switch from −15 volts to zero volts; while the singal $\overline{\text{IN}}$ will switch from zero volts to −15 volts. Under these circumstances, the gate of transistor Q5 goes negative; whereupon both transistors Q3 and Q5 are conductive by virtue of the negative charge stored on capacitor 62. Consequently, the voltage at point 56 falls toward zero volts; transistor Q2 cuts off; transistor Q1 conducts; and the voltages at points 52 and 56 are reversed as shown by wave form Q in FIG. 6. That is, the voltage at point 56 switches from −15 volts to zero while that at point 52 switches from zero to −15 volts. At time $t_2$, the voltage on the gate of transistor Q7 is negative since it is connected to point 52. Consequently, transistor Q7 conducts but transistor Q9 is turned off since point 56 (Q) is zero. At time $t_1$, the voltage on point 52 switches to −15 volts as explained above. At this time, however, capacitor 64 cannot charge through transistors Q10 and Q12 since transistor Q12 is cut off due to the fact that the IN voltage on terminal 40 is zero. At time $t_2$ the IN voltage on terminal 40 drops to −15 volts while that on terminal 42 goes to zero. As a consequence, capacitor 64 will now charge through transistors Q10 and Q12 such that, at time $t_3$, when the $\overline{IN}$ voltage on terminal 42 drops to −15 volts, transistors Q4 and Q6 will both conduct to reduce the voltage at terminal 52 to zero while establishing a voltage of −15 volts at terminal 56; whereupon the cycle is repeated.

It can be seen, therefore, that one pulse appears in output waveform Q on lead 58 for every two input pulses on terminal 40. These are applied to stage 2 which again divides by two. The output of stage 2 is then applied to stage 3 which again divides by two as in any conventional binary counter.

As was explained above, the voltage $V_M$ applied to the gates of memory elements M1 and M2 switches from −25 volts to +25 volts each time the first counter stage changes states. In accordance with the explanation given above, and assuming that the voltage at point 52 is zero with transistor Q2 conducting and transistor Q1 is cut off, the voltage across the gate insulator of memory element M2 will be −25 volts and the traps are charged positively corresponding to the high threshold state 26 in FIG. 4. The voltage across the gate insulator of memory element M1, however will be −10 volts; and it will remain in the low threshold state 34 in FIG. 4. Should there be a power failure, this condition of the memory elements M1 and M2 will persist. Now, when power is again established, the voltage on terminal 50, $V_{DD}$, again becomes −25 volts. This will be coupled through the load element L1, memory element M1 and point 56 to the gate of transistor Q2, causing it to conduct whereby a voltage of − 15 volts will be established at point 56 and zero volts at point 52, the same condition which persisted before the power failure.

An important feature of the invention is the keeper load elements K1 and K2 in parallel with L1, M1 and L2, M2, respectively. These are included to prevent the loss of operation of the counter when the memory load element M1 or M2 is turned OFF during the positive memory clear pulse.

Other elements, such as transistors Q15 and Q16 are provided to discharge critical internal storage nodes (i.e., gates Q3 and Q4) to ground quickly during a power loss, thereby insuring return to the memorized counter state. The keeper load elements K1 and K2 also limit positive-going transients by source follower action.

As was explained above, the MNOS memory elements M1 and M2 are incorporated in series with static P-channel load elements L1 and L2. Feedthrough of the plus or minus 25 volt memory pulse must be minimized to avoid an undesirable change of state of the counter. The memory elements M1 and M2 minimize the feedthrough signal between the memory gate and source (memory sources connected to the output Q or $\overline{Q}$) in two ways. First, a minimum gate area is used as shown in FIG. 1, reducing capacitive feedthrough. Secondly, but most important, is the reduction of the field between the gate and the source during the positive $V_M$ pulse. This reduces current between the source and gate to a negligible level. Note from FIG. 1 that between the source and the gate of the memory elements there is a 100–500 Angstrom unit and preferably 400 Angstrom unit thick oxide and a similar thickness of silicon nitride. If the thin oxide of the memory portion intermediate the drain and source were present over the drain and source as in the case of an unprotected MNOS memory element, the field would be much larger due to the reduced thickness of this area. This large field increases the current between the memory gate and the source by several orders of magnitude since the tunneling current is exponentially dependent on the oxide field. In other words, the thicker oxide regions over the drain and source minimize the field between the gate and source and, hence, minimize the possibility of feedthrough of the memory pulse giving a false output from the counter stage.

A typical fabrication of the switching transistor Q1, for example, in series with memory element M1 and load element L1 on an integrated circuit substrate is shown in FIG. 7. The substrate in N-type silicon and is identified by the reference numeral 70. A layer 72 of silicon dioxide covers the upper surface of the substrate 70, and above the layer 72 is a layer 74 of silicon nitride. The P+ diffusions 76 and 78 form the source and drain electrodes of transistor Q1; while the gate 80 of this same transistor Q1 is positioned between the diffusions 76 and 78. P+ diffusions 78 and 82 form the source and drain, respectively, of the memory element M1; while the gate of memory element M1 is formed by metalization 84. Note that the silicon dioxide layer thickness is decreased essentially midway between the diffusions 78 and 82 to provide the enhancement mode limited operation described above while at the same time preventing feedthrough of the memory pulse.

The load element is formed by P+ diffusions 82 and 86; while the gate of the load element is formed by metalization 88. All other transistors shown in the circuit of FIG. 5, for example, are formed on the substrate 70; and all transistors are covered with a layer of silicon dioxide and silicon nitride. However, the thickness of the silicon dioxide is reduced only between the source and drain regions of the memory elements M1 and M2.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In combination, a bistable counter stage comprising a pair of electron valves interconnected such that when one valve conducts the other is cut off and vice versa, a metal-nitride-oxide semiconductor memory device and a load element connected in series with each of said valves such that current can flow through a valve and thence between the source and drain of a memory element to said load element, each of said memory elements being capable of storing at a nitride-oxide interface electronic states representative of a conducting or non-conducting condition of its associated electron valve, means for applying a pulse to the gate electrodes of said memory devices after each change of state of said bistable stage to clear the previously stored electronic states at the nitride-oxide interfaces of the respective memory devices, and means for preventing feedthrough of said pulse to said bistable stage, said last-mentioned means including a region of reduced thickness in a silicon dioxide layer between the source and drain regions of each of the memory elements.

2. The combination of claim 1 wherein the source and drain regions of each memory element are formed in a semiconducting substrate, the layer of silicon dioxide being formed over said substrate above said source and drain regions, and a layer of silicon nitride covering said layer of silicon dioxide, said electronic states being formed at the interface between said silicon nitride and silicon dioxide layers.

3. The combination of claim 2 wherein the thickness of the silicon dioxide layer on opposite sides of said region of reduced thickness upon application of said pulse is such as to reduce the field in the oxide between the gate and source regions to such a value that a change of state of said counter due to current feedthrough does not occur.

4. The combination of claim 1 wherein said electron valves and said load elements also comprise metal-nitride-oxide semiconductor devices formed on a single substrate with said memory devices.

5. The combination of claim 1 including metal-nitride-oxide semiconductor keeper elements for each of said memory elements, said keeper elements being connected with their source and drain elements in parallel with the parallel combination of a memory element and a load element, means for applying a potential negative relative to the potential on the source to the drain element of each of said keeper elements, and means for applying a potential negative relative to the potential on the source to the gate electrodes of each of said keeper elements.

6. The combination of claim 5 including metal-nitride-oxide semiconductor devices for applying pulses to be counted to the electron valves of said bistable stage, and means for deriving from said stage a single output pulse for every two input pulses counted.

* * * * *